(No Model.)
S. H. BURCH.
ANIMAL TRAP.
No. 472,852.  Patented Apr. 12, 1892.
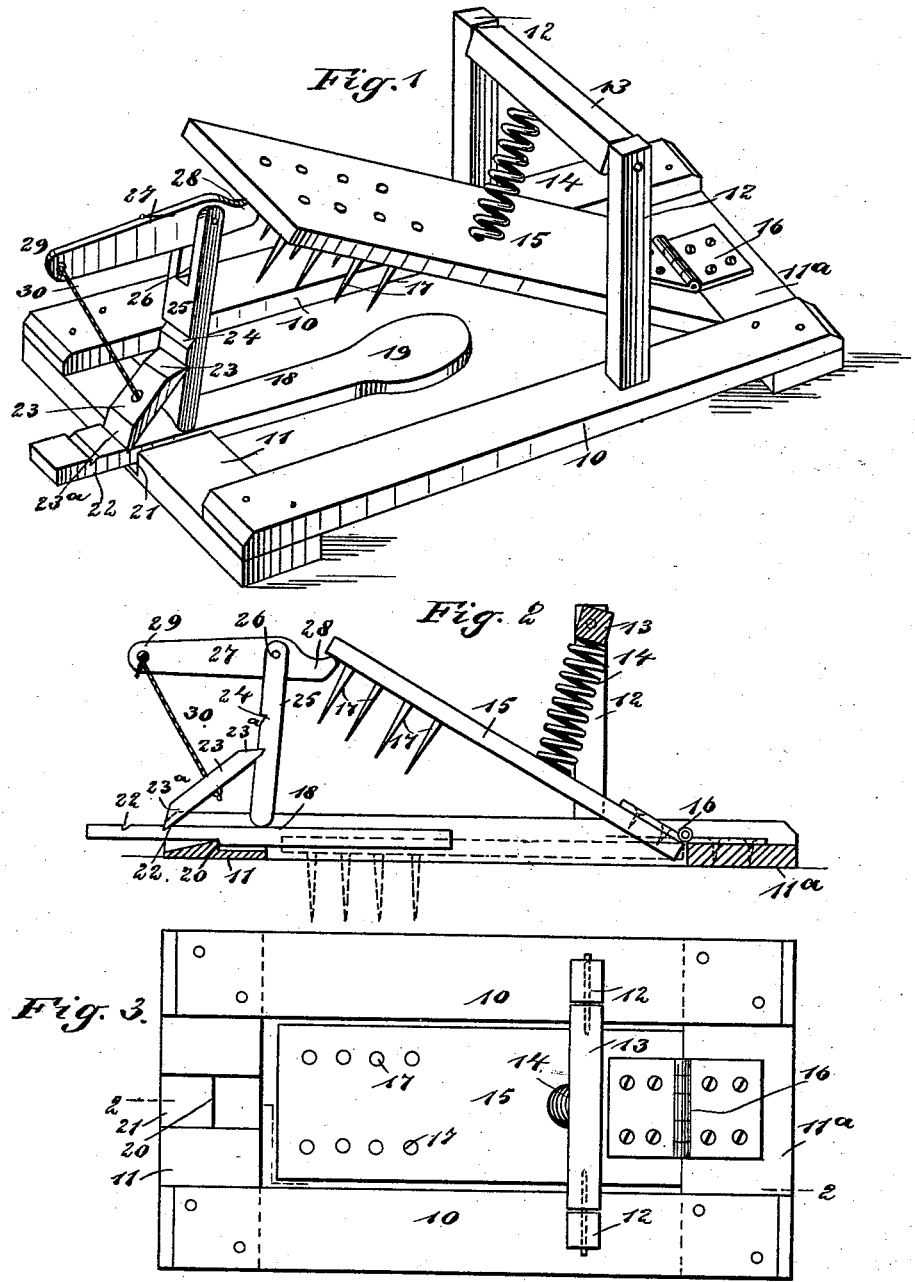
WITNESSES:
J. A. Bergstrom
C. Sedgwick
INVENTOR:
S. H. Burch
BY
Munn & Co
ATTORNEYS.

UNITED STATES PATENT OFFICE.

SAMUEL H. BURCH, OF RUSSELLVILLE, ARKANSAS.

ANIMAL-TRAP.

SPECIFICATION forming part of Letters Patent No. 472,852, dated April 12, 1892.

Application filed February 9, 1892. Serial No. 420,844. (No model.)

*To all whom it may concern:*

Be it known that I, SAMUEL H. BURCH, of Russellville, in the county of Pope and State of Arkansas, have invented a new and Improved Animal-Trap, of which the following is a full, clear, and exact description.

My invention relates to improvements in animal-traps; and the object of my invention is to produce a simple, cheap, and positively-acting trap which is especially adapted for catching small animals—such, for instance, as moles—and which when sprung is very sure to kill the animal.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a perspective view of the trap embodying my invention, showing the same set ready for use. Fig. 2 is a longitudinal section of the same on the line 2 2 in Fig. 3, and Fig. 3 is a plan view of the trap with the trigger and its connecting mechanism removed.

The trap is provided with a base comprising the parallel side pieces 10 and the connecting end pieces 11 and 11ª, which are secured to the under side of the side pieces, and mounted on the side pieces near the rear end of the trap are uprights 12, in the upper ends of which is journaled a cross-piece 13, which connects by means of a spring 14 with the drop-plate 15, which is hinged at one end, as shown at 16 to the end piece 11ª, and which has on its under side and near its free end projecting spikes 17, which are arranged in rows, as shown in Fig. 3, so as to clear the trigger when the trap is sprung, and which are adapted to pierce and kill the animal caught in the trap. The spring 14, which connects the drop-plate with the cross-piece 13, is compressed when the drop-plate is raised, and the pressure of the spring throws the drop-plate forcibly downward.

A trigger 18 extends longitudinally into the front portion of the trap and terminates at its rear end in a widened plate 19, adapted to carry bait, or to be raised by a mole or other animal, and this trigger has a notch on the under side, which is pivoted on the knife-edge 20 in a transverse recess 21 of the end piece 11. On the front end of the trigger and on the upper side are transverse parallel notches 22, which are adapted to receive one of the beveled ends 23ª of the catch 23, the opposite beveled end of the catch being adapted to enter notches 24 in an upright 25, which is mounted on the trigger 18 above the end piece 11, and which has a forked upper end 26 in which is pivoted a lever 27, one end 28 of which is adapted to extend beneath the free end of the drop-plate 15, as shown in Fig. 1, and the opposite end 29 of which connects by a cord 30 with the catch 23, so that when the catch is released the lever 27 may tip up and permit the drop-plate to fall.

The operation of the trap is as follows: If the trap is to be set for moles, the drop-plate 15 is raised and held in the manner described. A small depression is made in one of the roads frequented by the moles, and the trap is placed so that the inner end of the trigger 18 will come above this depression. Then when the mole attempts to pass beneath it he will will raise the trigger, thus depressing the front end of the same, releasing the catch 23, and freeing the lever 27, so that the spring 14 will cause the drop-plate 15 to fall down and the pikes 17 will pierce the mole.

If the trap is to be set for larger animals, it is set in the same way, except that the catch 23 may be adjusted in the slots 22 and 24 so as to receive the inner end of the trigger 18, and bait is secured to the plate 19, and when the animal attempts to get the bait he raises the trigger 18 so as to release the catch 23 and the drop-plate springs down upon him in the manner already described.

Having thus described my invention, I claim as new and desire to secure by Letters Patent—

1. An animal-trap comprising an open base, a spring-pressed drop-plate pivoted on one end of the base and provided on its under side and near its free end with projecting spikes, a trigger extending beneath the drop-plate, an upright mounted on the trigger, a lever pivoted on the upright and adapted to extend beneath the drop-plate, and a catch connected with the outer end of the lever and detachably secured to the upright and trigger, substantially as described.

2. An animal-trap comprising an open base, a spring-pressed drop-plate hinged to one end of the base and provided with spikes on its under side, a trigger pivoted on the front end of the base and extending beneath the drop-plate, said trigger having transverse notches therein, a notched upright mounted on the trigger, a lever pivoted in the upper end of the upright and extending beneath the drop-plate, a catch having beveled ends to enter the notches of the trigger and upright, and a cord connecting the catch and the forward end of the lever, substantially as described.

3. In an animal-trap, the combination, with the open base having a drop-plate hinged to the rear end thereof, which drop-plate has spikes on its under side, of uprights secured to the frame on each side of the drop-plate, a cross-piece journaled in the upper ends of the uprights, a spring arranged between the drop-plate and the cross-piece, a trigger pivoted on the front end of the frame and extending beneath the drop-plate, an upright mounted on the trigger, a lever pivoted in the upright and extending beneath the drop-plate, and a catch connected with the lever and adapted to support the upright, said catch being released by the movement of the trigger, substantially as described.

SAMUEL H. BURCH.

Witnesses:
A. R. GOSSARD,
MICHAEL LOWERY.